W. G. PERKINS & W. M. BARKER.
HEATING AIR FOR METALLURGICAL FURNACES.
APPLICATION FILED FEB. 25, 1910.
996,132.
Patented June 27, 1911.
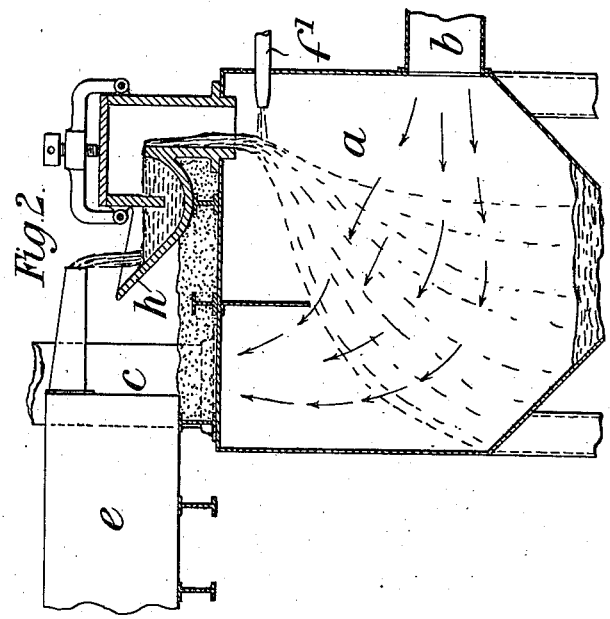
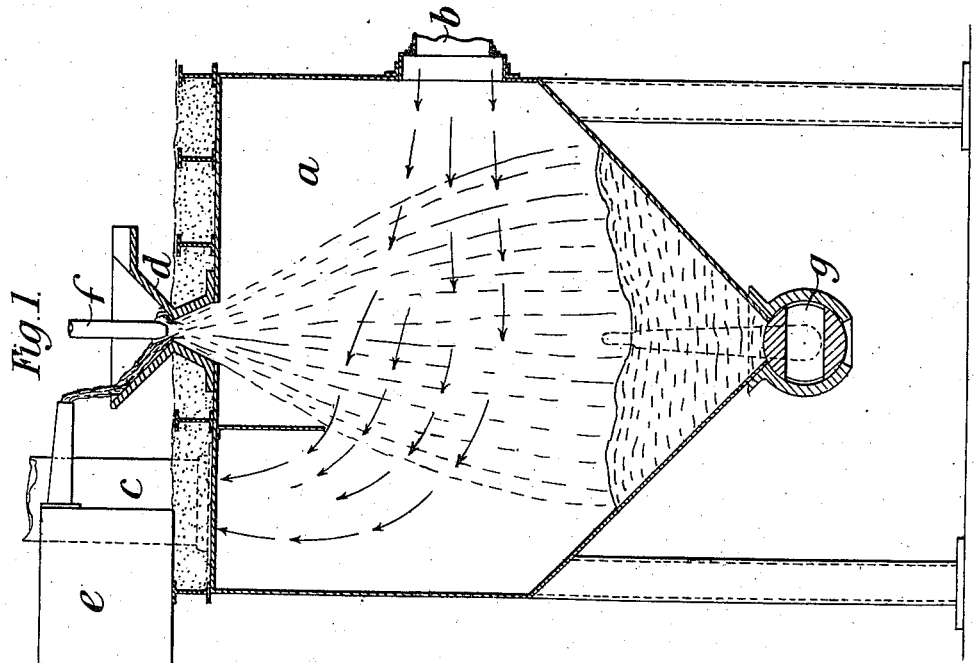

UNITED STATES PATENT OFFICE.

WALTER GEORGE PERKINS AND WILLIAM MATTHEW BARKER, OF LONDON, ENGLAND.

HEATING AIR FOR METALLURGICAL FURNACES.

996,132. Specification of Letters Patent. Patented June 27, 1911.

Application filed February 25, 1910. Serial No. 546,023.

*To all whom it may concern:*

Be it known that we, WALTER GEORGE PERKINS, a subject of the King of Great Britain, residing at Whitehall Hotel, Montague street, London, England, and WILLIAM MATTHEW BARKER, a citizen of the United States of America, residing at 7 Salcombe Gardens, North Side, Clapham Common, London, England, have invented new and useful Improvements in and Connected with the Heating of Air for Metallurgical Furnaces, of which the following is a specification.

Our invention relates to the heating of the air used for the blast in metallurgical furnaces, and consists in passing such air over molten slag in such a manner, that not only is the air heated but the slag is cooled or chilled and granulated or disintegrated.

In carrying out our invention we provide for introducing the slag into a closed chamber or vessel through which the air for furnishing the blast is caused to flow, the slag being driven into the said chamber by a jet or jets of air in such a manner that it is more or less broken up or reduced to particles which offer a relatively large surface for contact with the air, whereby a relatively large proportion of the heat carried by the slag is taken up by the air and returned to the furnace with the blast.

The apparatus which we employ for carrying our invention into practice, consists of a chamber provided with an orifice through which the slag enters, and of a pipe for directing a current of high-pressure air against the in-coming slag and granulating it in the manner hereinbefore referred to.

In order to prevent the escape of air from the chamber, the air jet may be directed through the nozzle through which the slag enters, or the slag may be arranged to flow through a kind of dip-trap which will prevent the escape of the blast air, the high-pressure air jet being then directed against the slag at any suitable point. Suitable means are provided for removing from time to time the granulated slag which collects in the bottom of the chamber.

Our invention will be readily understood by reference to the accompanying drawing, in which:—

Figure 1 is a sectional elevation illustrating the arrangement of our invention, wherein the high-pressure air jet is injected through the orifice through which the slag enters, and Fig. 2 is a similar view illustrating an arrangement wherein the slag flows through a sealing-trap, the high-pressure air jet impinging against it as it enters the chamber.

$a$ indicates the closed chamber or vessel into which the low-pressure air or blast enters through the pipe $b$ and from which it passes to the rear of the furnace through the pipe $c$.

As shown in Fig. 1 the chamber $a$ has upon it a hopper $d$ into which the slag from the blast furnace settler $e$ flows, and into which a nozzle $f$ for the high-pressure air jet dips, in such a manner that the slag which enters the hopper $d$ will be driven through the orifice at the bottom of the hopper and will spread out and scatter in the chamber, thus exposing a large area of surface to the blast air flowing through the chamber $a$ from the pipe $b$ to the pipe $c$. The injected air from the nozzle $f$ being of higher pressure than the blast air flowing from the chamber to the furnace, induces such a current through the orifice of the hopper that the air in the said chamber $a$ is prevented from flowing back into the atmosphere. This injecting air jet can be so adjusted as to pressure and volume that it will be just sufficient to cool and break up the molten slag into granules and at the same time drive the slag into the chamber. The bottom of the chamber $a$ is made hopper-shaped to receive the granules, and is provided with a valve or gate $g$, or with a water-sealed trap, or otherwise so constructed that the cooled and granulated slag may be removed from time to time.

The apparatus shown in Fig. 2 differs from that shown in Fig. 1, in that the slag instead of entering through a hopper $d$ under the direct action of the air blast, enters such chamber through a trap $h$ which prevents the escape of air. In this modification the nozzle $f^1$ for the high-pressure air jet is arranged to strike the current of slag as it enters the chamber.

The arrangements hereinbefore described are especially adapted for use in connection with blast and other furnaces from which there is a continuous flow of slag. It is to be understood, however, that our invention is equally applicable for use in connection with furnaces from which the discharge of slag is intermittent; in such cases the slag would be delivered into pots or portable receivers and transported to the chamber *a* into which it would be gradually introduced as required; or the slag from periodically skimmed surfaces could be conveyed in slag pots or runners from the furance to a suitable reverberatory furnace located near the chamber *a*, this furnace being provided with a fire-box to furnish heat to keep the slag stored in the furnace hot and in a liquid state so that it will flow freely and continuously into the chamber *a* when required.

With a properly constructed furnace for storing the molten slag, very little fuel would be required to keep the slag in a liquid condition.

Having now particularly described and ascertained the nature of our said invention and in what manner the same is to be performed, we declare that what we claim is:—

1. The method of heating blast air for metallurgical furnaces, which consists in introducing molten slag into a closed chamber at approximately the top of the same, and granulating the same by a jet of air under high pressure, causing it to fall in a granulated condition to the bottom of the chamber, and passing the blast of air to be heated through the falling particles, substantially as described.

2. An apparatus for heating blast air for metallurgical furnaces, comprising a closed chamber having an inlet and an outlet for the current of air to be heated, said chamber having an inlet for the molten slag, and means for causing air under high pressure to granulate the slag to cause the same to fall through the air to be heated, substantially as described.

3. An apparatus for heating air for metallurgical and other furnaces, comprising a closed chamber having an inlet for admitting molten slag thereto, an inlet for air under high pressure to granulate said slag, an inlet for the air to be heated directing said current of air through the granulated slag and an outlet for the heated air.

4. An apparatus for heating air for metallurgical and other furnaces, comprising a closed chamber provided with means for the passage of the air to be heated therethrough, said chamber having an inlet for molten slag, adapted to prevent the escape of air from the chamber, and an inlet to cause a jet of air under high pressure to granulate the slag.

5. An apparatus for heating blast air for metallurgical furnaces, comprising a closed chamber having an inlet and an outlet for the air to be heated and providing for the passage of a current of such air through said chamber, an inlet for the admission of molten slag to said chamber, a nozzle for the admission of a jet of air under high pressure located to engage the molten slag above the current of air to be heated, whereby the granulated slag will fall through the said air current.

WALTER GEORGE PERKINS.
WILLIAM MATTHEW BARKER.

Witnesses:
H. D. JAMESON,
R. F. WILLIAMS.